United States Patent [19]
Kawano et al.

[11] Patent Number: 5,714,822
[45] Date of Patent: Feb. 3, 1998

[54] COIL FOR ELECTRIC MACHINE AND MANUFACTURING METHOD THEREOF

[75] Inventors: Yusuke Kawano, Chiryu; Mitsuyuki Hayashi, Nishio, both of Japan

[73] Assignee: Nippondenso Co., Ltd., Kariya, Japan

[21] Appl. No.: 645,496

[22] Filed: May 16, 1996

[30] Foreign Application Priority Data

May 19, 1995 [JP] Japan ................ 7-121888

[51] Int. Cl.$^6$ ............... H02K 3/04; H02K 3/00; H02K 1/22
[52] U.S. Cl. ................ 310/179; 310/263
[58] Field of Search ............... 310/179, 180, 310/194, 263; 242/159, 118.4, 118.7; 29/605; 174/133 R

[56] References Cited

U.S. PATENT DOCUMENTS

| | | |
|---|---|---|
| 4,228,377 | 10/1980 | Kreuzer ................ 310/263 |
| 4,925,125 | 5/1990 | LeCompte ................ 242/118.4 |
| 4,988,055 | 1/1991 | Sakai et al. ................ 242/159 |
| 5,154,366 | 10/1992 | LeCompte ................ 242/159 |
| 5,174,013 | 12/1992 | Hiroshima et al. ................ 29/605 |
| 5,209,416 | 5/1993 | LeCompte ................ 242/159 |
| 5,574,324 | 11/1996 | Hirama et al. ................ 310/263 |

FOREIGN PATENT DOCUMENTS 2-243468  9/1990  Japan.

*Primary Examiner*—Clayton E. LaBalle
*Attorney, Agent, or Firm*—Cushman, Darby & Cushman IP Group of Pillsbury, Madison & Sutro LLP

[57] ABSTRACT

A magnet wire having generally round cross section is taken out from a wire pack and formed by a forming roller mechanism into a polygonal shape in cross section to be wound on a bobbin tightly, thereby increasing the space factor of a coil. Then, magnet wire having round cross section is wound in a portion where pressure may be applied from the outside. Since the round wire is easy to move and able to dodge the pressure, a reliable coil of a high space factor can be obtained.

5 Claims, 8 Drawing Sheets

COIL FOR ELECTRIC MACHINE AND MANUFACTURING METHOD THEREOF

CROSS REFERENCE TO RELATED APPLICATION

The present application is based on and claims priority from Japanese Patent Applications No. Hei 7-121888, filed on May 19, 1995, the contents of which are incorporated herein by reference.

BACKGROUND OF THE INVENTION

1. Field of the Invention

The present invention relates to a coil of an electric machine including a generator and a motor, and more particularly relates to a field coil of an alternator for a vehicle and a manufacturing method thereof.

2. Description of the Related Art

U.S. Pat. No. 5,174,013 (which corresponds to JP-A-63-190310) and JP-A-2-243468, filed by the same assignee, propose a rotor of an alternator which has a field coil or rotor coil of magnet wire having a polygonal (rectangular or hexagonal) cross-section formed by a forming roller mechanism. Such magnet wire is, as indicated by a reference numeral 110 in FIG. 14, wound along a spiral groove 101 formed as a guide on a cylindrical surface of a bobbin 100 to form a first layer (bottom layer) and subsequently wound along a spiral groove formed between adjacent magnet wires of the first layer to form a second layer. The magnet wire of the third layer is formed on the second layer, and the same process is repeated to form the rotor coil having a designated number of turns. Thus, the space factor of the rotor coil is increased.

After the magnet wire 110 is wound around the bobbin 100, pole cores 120 are inserted into a center hole of the bobbin 100 from opposite sides thereof. At that time the magnet wire 110 in upper layers is pressed by inclined inner surfaces of claw portions 121 of the pole cores 120 as shown in FIG. 14. Because the layers of the polygonal magnet wire are held tighter in place by itself than the common round magnet wire, the magnet wire can not avoid the pressure from the claw portions.

As a result, coating 111 (shown in FIG. 15) of a corner of the magnet wire 110b in the upper layer, which crosses a corner of the magnet wire 110a in the lower layer, is subject to damage and conductor member (or copper core) 112 may become exposed since insulating coating 111 of the corner is generally thinner than that of other portions. In addition, since the coil 110 has the polygonal cross-section, the corner of the magnet wire 110 in the uppermost layer may dig into an insulating flange 102 of the bobbin 100 (made of resinous material) disposed between the claw portions 121 and the rotor coil.

As a result, the conductor member 112 may come into contact with the pole core 120 as shown in FIG. 14, causing insulation trouble and a decrease of the output power of the generator.

SUMMARY OF THE INVENTION

The present invention is made in view of the above-mentioned problem, and therefore, a main object of the present invention is to provide an improved rotor coil which has a high space factor.

Another object of the present invention is to provide a coil for an electric machine having a cylindrical bobbin and a magnet wire wound around the bobbin, wherein the magnet wire comprises a first portion having a generally polygonal cross-section forming a winding-layer having a high space factor and a second portion having a generally round cross-section forming a winding layer having a loose binding force disposed where outside pressure is directly applied.

In the coil for an electric machine as mentioned above, the second portion is preferably located at an upper portion of the coil in contact with an inner portion of a pole core of a generator.

In the coil for an electric machine as mentioned above, the first portion may have a rectangular, rhomboidal or hexagonal cross-section.

Another object of the present invention is to provide an improved method of manufacturing the above improved rotor coil.

An improved method of manufacturing a coil for an electric machine comprising steps of winding a first portion of a magnet wire having a polygonal shape on a bobbin to form first layers having high space factor and winding a second portion of the magnet wire having a round shape on the first layers so that the second portion can move without damage when an outside pressure is applied to the second portion.

A further object of the present invention is to provide a method of manufacturing a coil for an electric machine comprising steps of forming a first portion of a magnet wire into a first shape which is effective to increase a space factor of the coil for an electric machine, winding the first portion of the magnet wire on a bobbin to form a first layer so that a spiral groove is formed between adjacent turns of the first portion on the first layer, winding the first portion along the spiral groove of the first layer to form a second layer so that the spiral groove is formed between adjacent turns of the first portion, repeating last the step until the first portion is wound to a prescribed number of turns, and winding a second portion of the magnet wire having a shape which is easy to move on a layer of the first portion to form layers so that the second portion can move without damage when an outside pressure is applied to the second portion.

In the above-mentioned method, the first-portion-forming step preferably comprises a step of forming by a forming roller mechanism composed of a plurality of rollers for squeezing the magnet wire in radial directions.

In the above-mention method of manufacturing a generator the second-portion-winding step may comprise a step of changing location of the rollers in a radial direction before winding of the second portion.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments are described with reference to the appended drawings.

Figure 1:
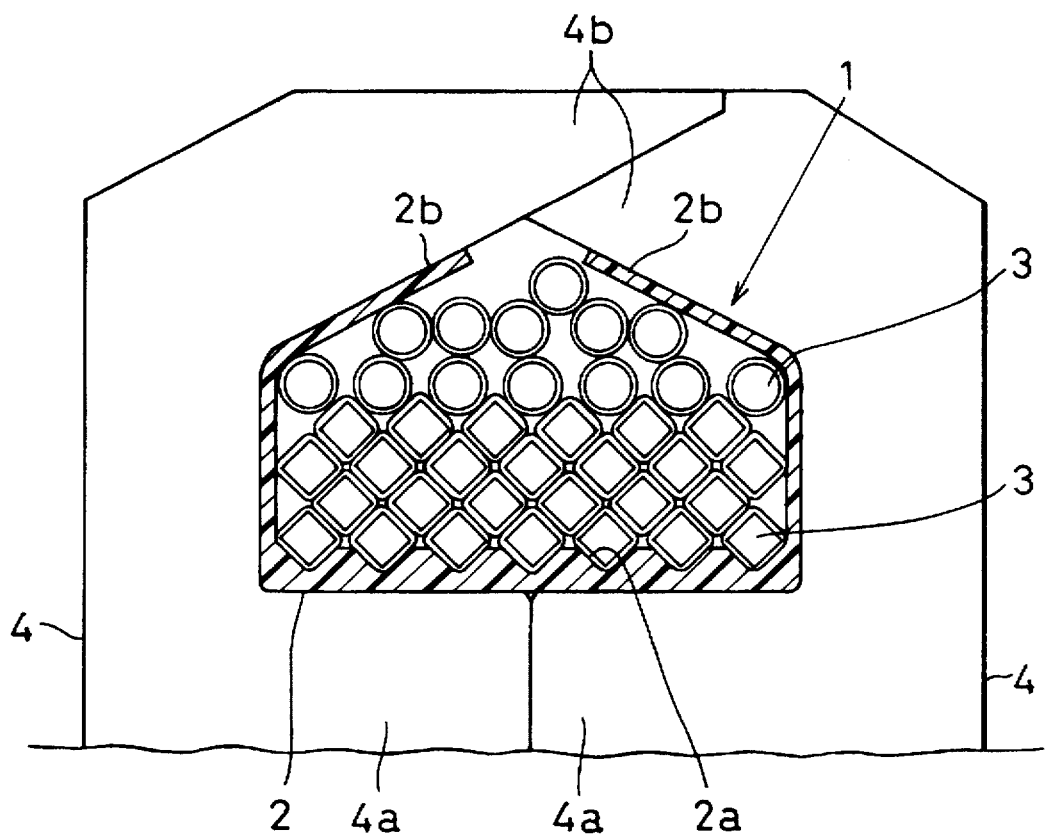
FIG. 1 is a cross-sectional side view illustrating a rotor coil disposed between pole cores according to the present invention.

In FIG. 1, a rotor coil 1 is composed of a magnet wire 3 which is wound a prescribed number of turns on a surface of a cylindrical bobbin 2 and disposed between a pair of pole cores 4. The rotor coil 1 is used as the field coil disposed in a Lundell type rotor of the well-known vehicle alternator and, therefore, detailed description of the rotor is omitted.

The bobbin 2 is molded out of thermoplastic resinous material such as nylon. The bobbin 2 has a cylindrical surface having a guiding spiral groove 2a, a center hole and insulating flanges 2b formed on the opposite ends of the cylindrical surface.

The guiding spiral groove is formed in the cylindrical surface to conform to and outline a bottom layer of the magnet wire 3 wound on the surface of the bobbin 2. That is, triangular spiral groove are formed in the cylindrical surface to receive the corner of the magnet wire as shown in FIG. 1.

The insulation flange 2b is disposed between the magnet wire 3 and the pole core 4.

Figure 2A:
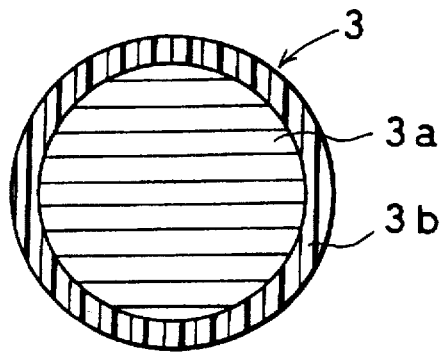
FIGS. 2A and 2B are cross-sectional views illustrating a magnet wire wound in different layers of the rotor coil.
Figure 2B:
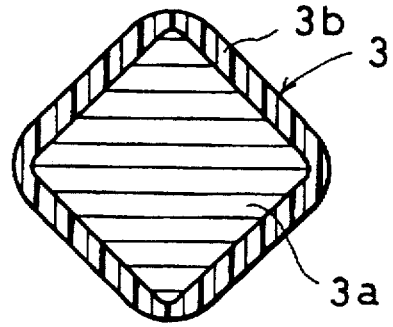

The magnet wire 3 is composed of a core member 3a made of a conductive material such as copper which is enameled with insulation material such as polyester as shown in FIG. 2A and FIG. 2B. The magnet wire 3 is wound along the guiding spiral groove 2a to form a spiral groove between adjacent coils of the magnet wire 3 wound on the first (or bottom) layer and along the spiral groove of the bottom layer to form a spiral groove between adjacent coils of the magnet wire 3 on the second (or next) layer. Thus, the magnet wire is wound along the spiral groove formed on the former layer to form the spiral groove on the next layer successively.

Figure 3:
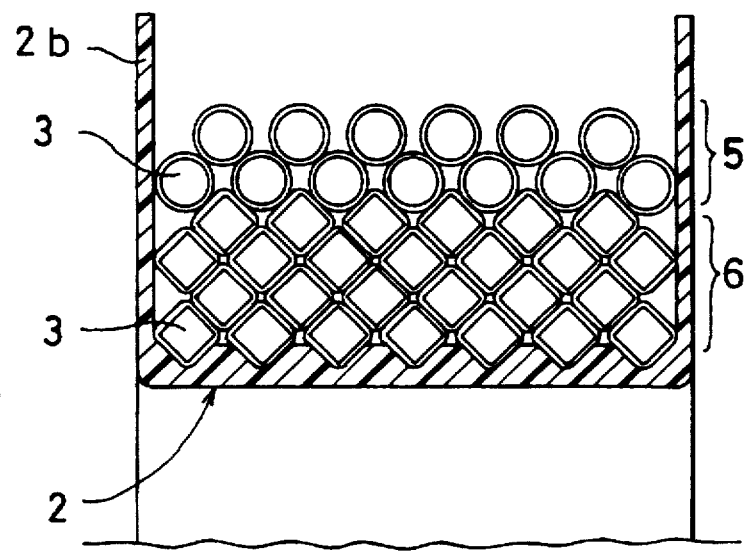
FIG. 3 is a cross-sectional side view illustrating a part of the rotor coil where any portion of the magnet wire does not cross with another portion.
Figure 4:
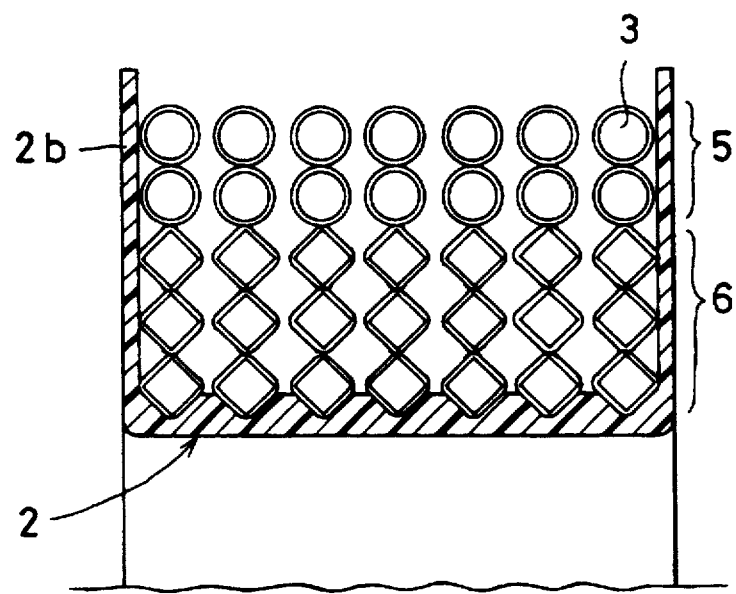
FIG. 4 is a cross-sectional view illustrating a part of the rotor coil where a portion of the magnet wire crosses with another portion.

The magnet wire 3 is wound differently from each other between upper layers 5 and lower layers 6 as shown in FIGS. 3 and 4. That is, the magnet wire in the lower layers is formed into a square in cross section as shown in FIG. 2B from a round wire as shown in FIG. 2A in cross section before it is wound.

The square magnet wire 3 in the lower layers 6 is wound tightly as shown in FIG. 3 so that a high space factor of the rotor coil can be obtained as compared to the round magnet wire in the upper layers 5. However, as shown in FIG. 4, the space factor of the rotor coil having the square magnet wire is not higher than the space factor of the rotor coil having the round magnet wire where a portion of the magnet wire 3 of an upper layer crosses over another portion of the magnet wire 3 of an lower layer.

The pole core 4 has a boss portion 4a which is inserted into the center hole of the bobbin 2 and claw portions. A pair of the pole cores 4 are fixed on the opposite ends of the rotor coil 1 so that each one of the claw portions of one of the pole core 4 is disposed between adjacent claw portions of the other pole core 4. When boss portions 4a of the pole cores 4 are inserted into the center hole of the bobbin 2, inner surfaces of the claw portions 4b press the flange portion 2b of the bobbin 2 to bend along the inner surfaces as shown in FIG. 1 thereby to cover the magnet wire 3 of the upper layers 5.

A method of manufacturing the rotor coil is described with reference to FIG. 5–FIG. 7.

Figure 5:
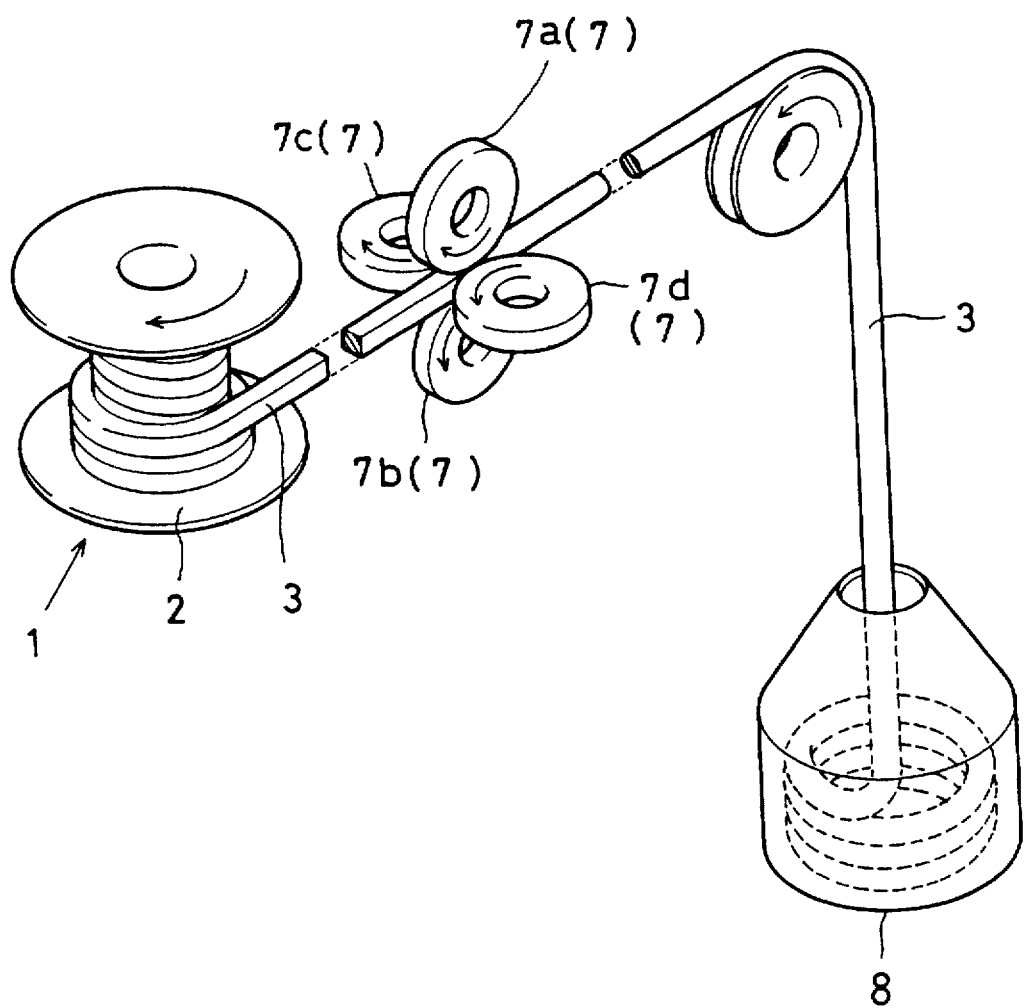
FIG. 5 is a perspective view illustrating a method of manufacturing a rotor coil.
Figure 6:
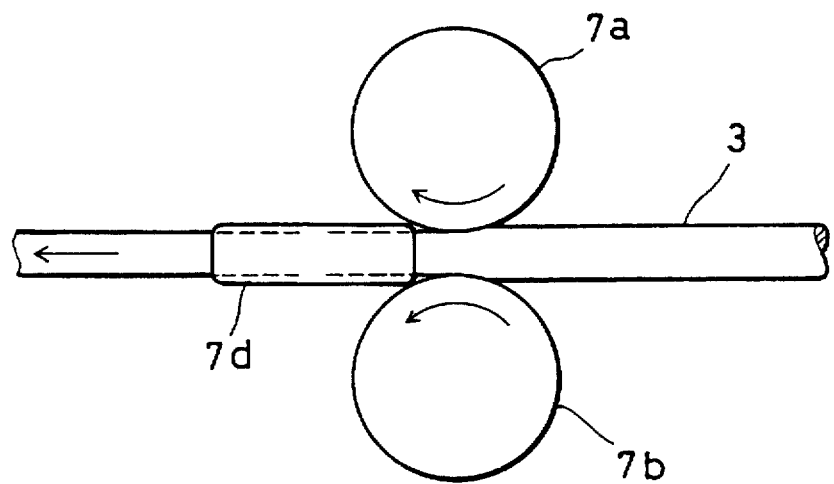
FIG. 6 is a side view illustrating a forming roller mechanism loaded with the magnet wire.

A portion of round magnet wire 3 to be wound in the lower layers 6 is taken out of a wire pack 8 and is formed into a square in cross section by a forming roller mechanism 7 composed of four rollers 7a, 7b, 7c and 7d just before the magnet wire 3 is wound around the coil bobbin 2 as shown in FIG. 5.

The roller mechanism 7 is composed of a pair of upper and lower rollers 7a and 7b and a pair of right and left rollers 7c and 7d. Each roller of the roller mechanism 7 has a flat disk fixed rotatably to a shaft (not shown). The upper and lower rollers 7a and 7b and the right and left rollers 7c and 7d are disposed along the magnet wire 3 so that they do not interfere with each other as shown in FIG. 6. Accordingly, the magnet wire 3 is formed by the upper and lower rollers 7a and 7b first, and by the right and left rollers 7c and 7d next into approximately a square in cross section.

The rollers 7a, 7b, 7c and 7d are rotated as the magnet wire 3 is taken out from the wire pack 8 when the bobbin 2 is rotated to be wound. However, the roller mechanism may be provided with driving motors respectively, which can control the rotating speed independently to adjust the winding tension.

Figure 7:
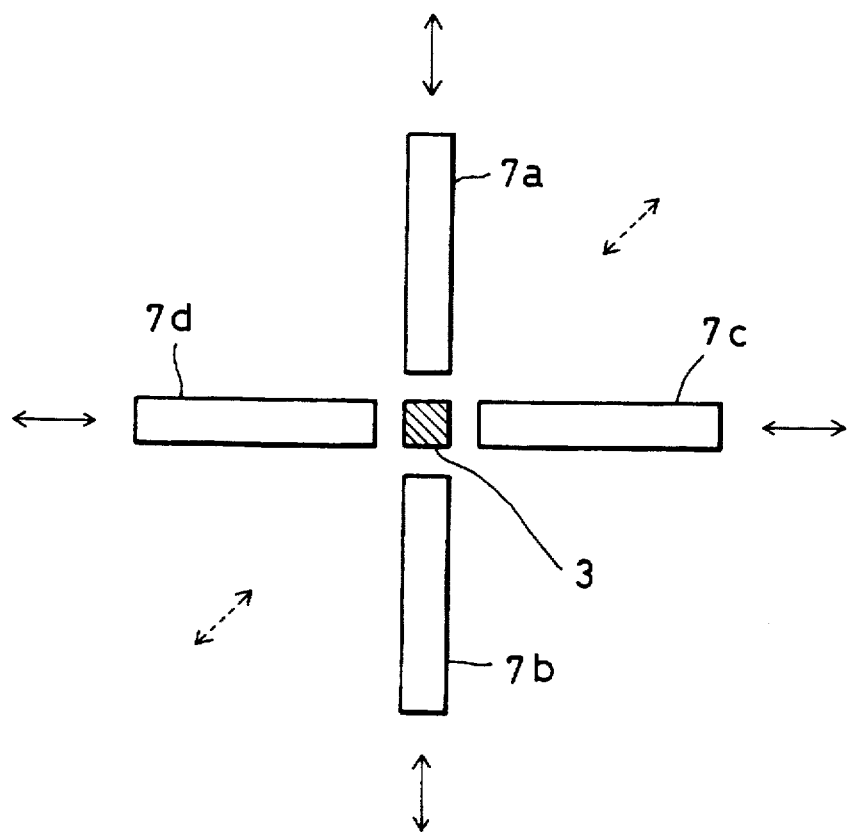
FIG. 7 is a front view illustrating the forming roller mechanism with the magnet wire in cross-section when the forming condition is changed.

If the forming condition of the magnet wire 3 is intended to change, at least one of the rollers is moved closer to or farther from the center axis of the magnet wire in the radial direction as shown in FIG. 7. The rollers 7a, 7b, 7c and 7d of forming roller mechanism 7 can be moved as follows: one by one in directions shown by solid lines; one of the pair of upper and lower rollers and right and left rollers can be moved in directions shown by the solid lines; or one or both of adjacent pairs of rollers can be moved in directions shown by broken lines, as shown in FIG. 7.

A portion of the round magnet wire 3 to be wound in the upper layers 5 is thereafter taken out of a wire pack 8. At least adjacent two rollers (7a and 7c or 7b and 7d) of the forming roller 7 are separated from the magnet wire 3 as shown by broken lines in FIG. 7 so that the round magnet wire 3 is wounded without forming to form the upper layers 5 having less binding force.

When the pole cores 4 are inserted into the center hole of the bobbin 2, the magnet wire in the upper layers 5 of the rotor coil 1 wound in the above described manner is easy to move as the inner surfaces of the claw portions apply pressure thereon and the pressure may not be transmitted to the lower layers 6 of the rotor coil 1. Thus, the magnet wire 3 is prevented from digging into the flange portion 2b of the bobbin 2.

As a result, coating 3b of the magnet wire 3 is prevented from damage being damaged, thereby increasing insulation strength (between layers and between a layer and a ground).

Since the pressure of the pole core which is inserted into the bobbin 2 is not transmitted through the upper layer to the lower layer, the insulation coating of the magnet wire can be made thinner.

[variations]

Figure 8A:
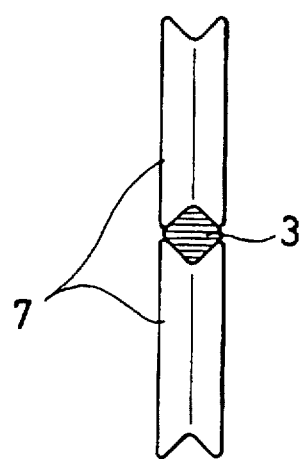
FIGS. 8A, 8B and 8C are front views illustrating various forming roller mechanisms.
Figure 8B:
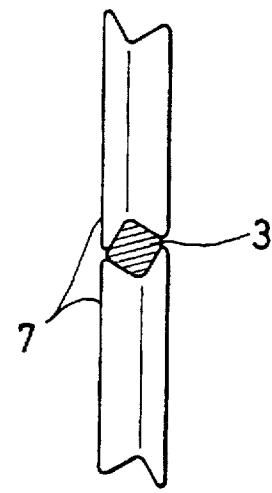
Figure 8C:
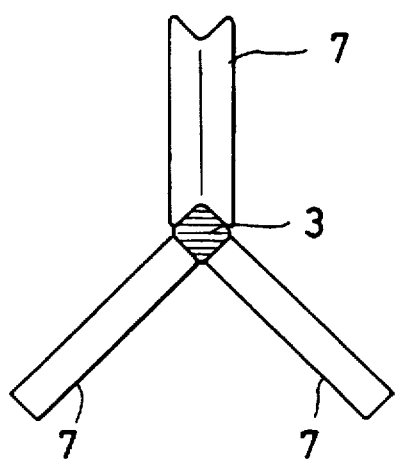

A variation of the forming roller mechanism 7 is shown in FIGS. 8A, 8B and 8C. Each of roller mechanisms 7 shown in FIGS. 8A and 8b is composed of two rollers each having a right angled groove on the peripheral surface thereof. A roller mechanism 7 shown in FIG. 8C is composed of three rollers, one of which has a right angled groove on the peripheral surface thereof.

Figure 9:
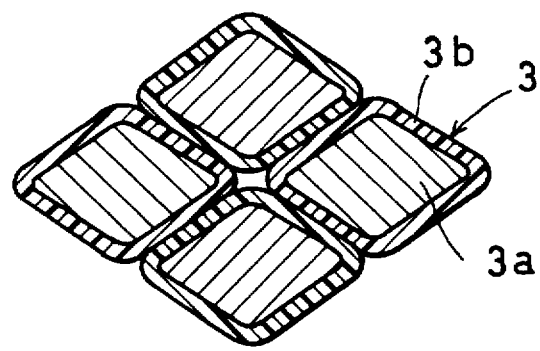
FIG. 9 is a cross-sectional view illustrating a variation of the magnet wire having a high space factor according to the invention.
Figure 10:
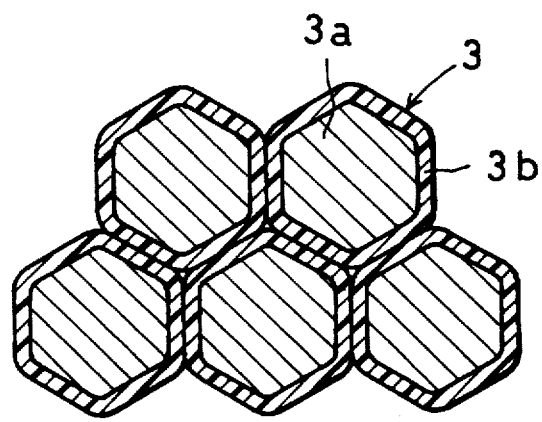
FIG. 10 is a cross-sectional view illustrating a variation of the magnet wire having high space factor according to the invention.

The forming roller 7 can be arranged to form the magnet wire 3 into a shape other than square in cross-section. The magnet wire can be formed into a rhombus in cross section as shown in FIG. 9 or a hexagon in cross section as shown in FIG. 10.

Figure 11:
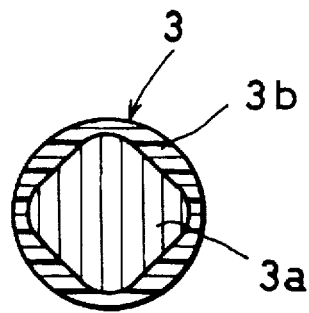
FIG. 11 a cross-sectional view illustrating a variation of the magnet wire having low binding force according to the invention.
Figure 12:
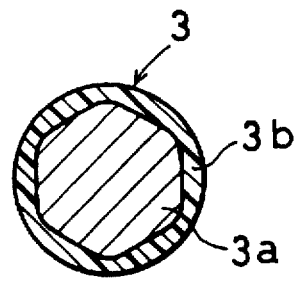
FIG. 12 is a cross-sectional view illustrating a variation of the magnet wire having low binding force according to the invention.

The magnet wire 3 for the upper layers 5 can be formed into a shape other than round in cross section as shown in FIG. 11 or FIG. 12 unless the shape increases the binding force. That is, the magnet wire for the lower layers 6 and for the upper layer 5 can be formed only by moving the rollers of the forming roller mechanism slightly in the radial direction to decrease the deforming ratio.

If the rollers of the forming roller mechanism are moved gradually while the magnet wire is wound in the upper layer, the shape of the cross section of the magnet wire changes gradually from the polygonal shape to the round shape in the upper layers 5.

The polygonal magnet wire 3 can be wound in the upper layer on the lower layers 6 of the round magnet wire if the pressure is mainly applied to the lower layers 6, or in both upper and lower layers which sandwich middle layers of the round magnet wire if the pressure is applied to the middle layers 9.

Figure 13:
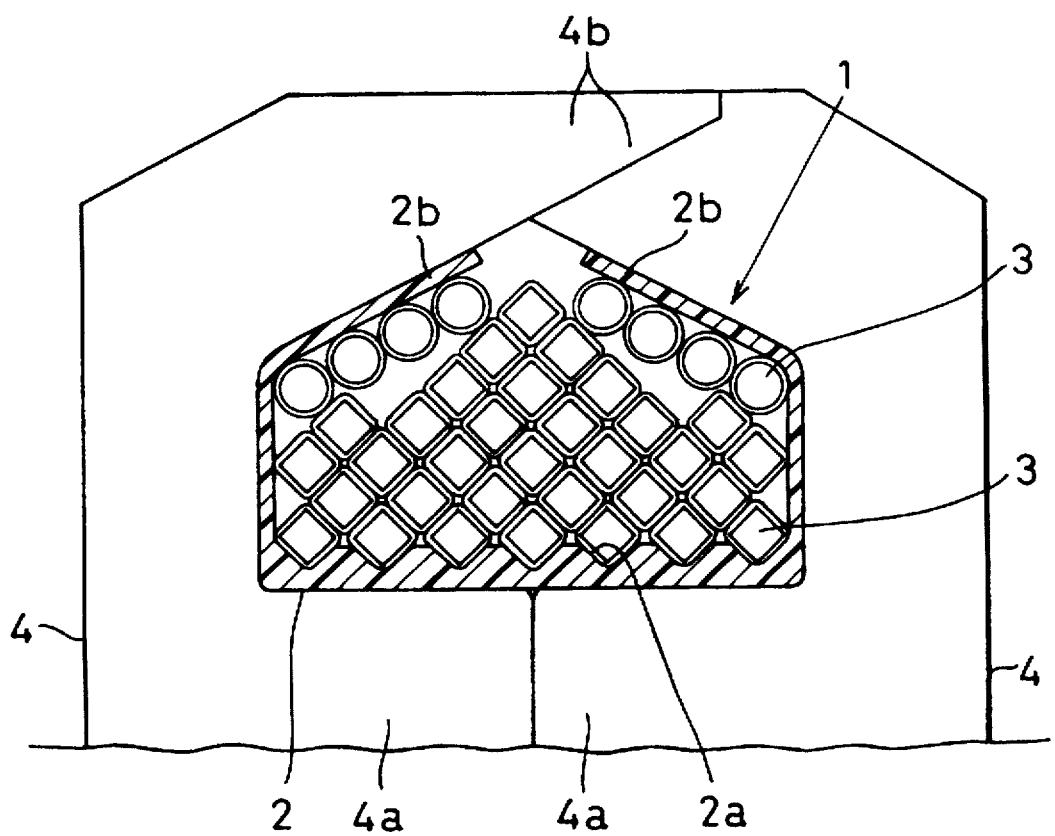
FIG. 13 is a cross-sectional side view illustrating a portion of the rotor coil according to the present invention where pressure is applied.
Figure 14:
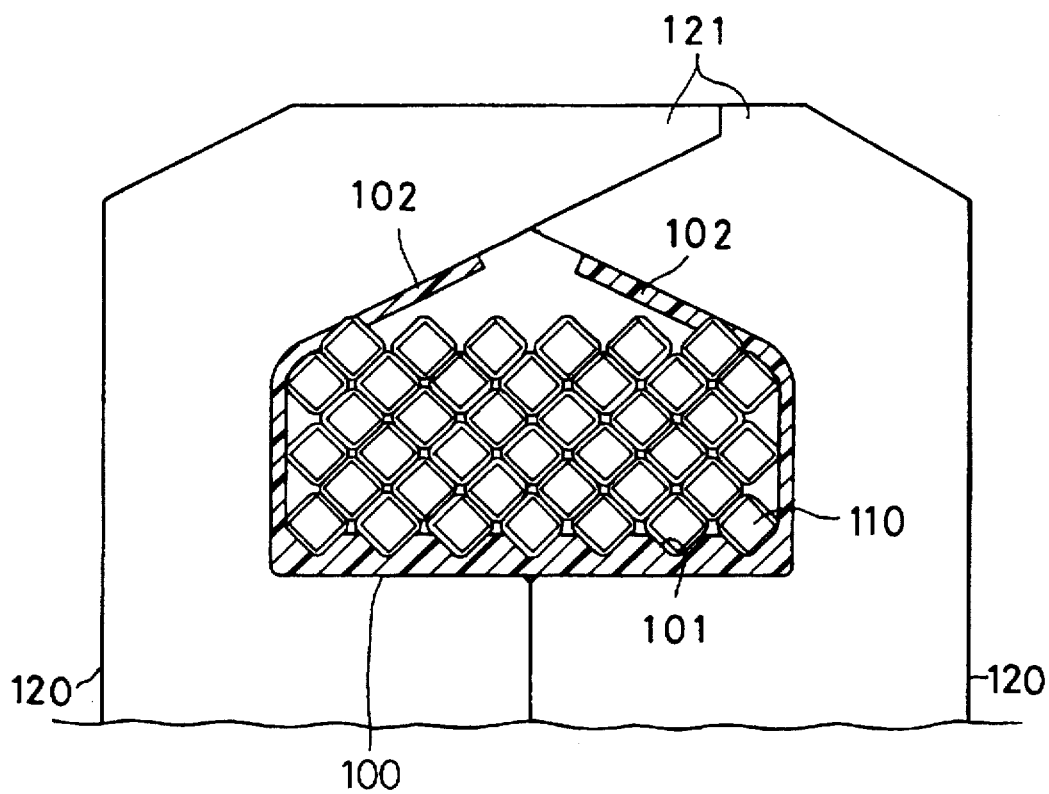
FIG. 14 is a cross-sectional side view illustrating a main portion of a conventional rotor.
Figure 15:
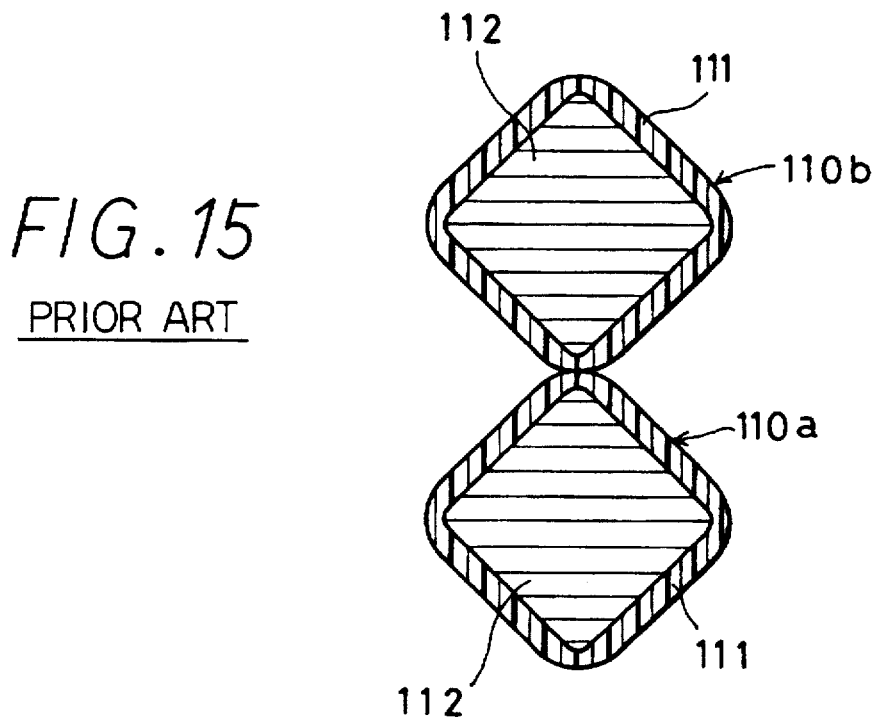
FIG. 15 is a cross-sectional view illustrating a portion of the magnet wire crossing with another in the above conventional rotor.

The round magnet wire or magnet wire of decreased deforming ratio can be wound by the forming roller mechanism only in upper corners of the lower layers 5 where the pole cores 4 apply pressure directly as shown in FIG. 13.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. For example, the present invention can be applied to a stator coil of a generator. Accordingly, the description of the present invention in this document is to be regarded in an illustrative, rather than restrictive, sense.

What is claimed is:

1. A coil for an electric machine comprising:

a cylindrical bobbin having a cylindrical surface and a pair of flexible insulating flanges disposed at opposite sides of said cylindrical surface;

a magnet wire comprising:

a first portion having a generally polygonal cross-section wound on said cylindrical surface closely to other segments of said first portion to form a tight winding layer, and a second portion integrally series-connected to said first portion having a generally round cross-section and approximately a same sectional area as said first portion wound on said first portion to form a loose winding layer, wherein said magnet wire of said loose winding layer moves when an outside pressure is applied thereto via said flexible insulating flanges.

2. The coil according to claim 1, wherein said cylindrical surface has a spiral groove for holding said first portion.

3. The coil according to claim 1, wherein said spiral groove is formed so that a layer of said first portion wound along said spiral groove forms a second spiral groove on said layer.

4. The coil according to claim 1, wherein said first portion has at least one of rectangular, rhomboidal and hexagonal cross-sections.

5. A field coil for an alternator for an automobile having a Lundell type rotor comprising:

a cylindrical bobbin having a cylindrical surface and a pair of flexible insulating flanges disposed at opposite sides of said cylindrical surface, said bobbin being disposed in said Lundell type rotor;

a magnet wire comprising:

a first portion having a generally rectangular cross-section wound on said cylindrical surface closely to other segments of said first portion to form a tight winding layer, and a second portion integrally series-connected to said first portion having a generally round cross-section and a same sectional area as said first portion wound on said first portion to form a loose winding layer, wherein said magnet wire of said loose winding layer moves to release pressure applied thereto when said cylindrical bobbin with said magnet wire is inserted in said Lundell type rotor.

* * * * *